Figure 1:
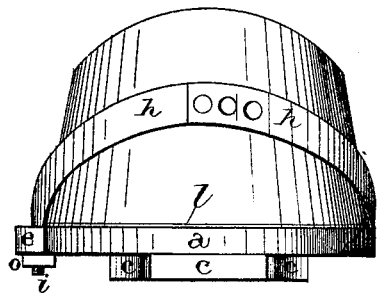
Figure 2:
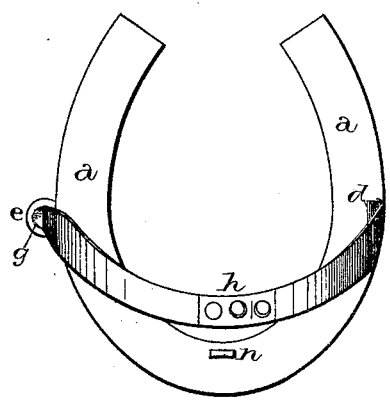
Figure 3:
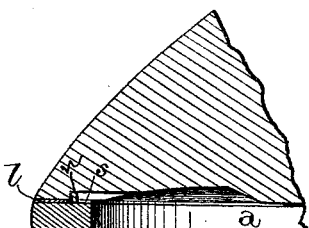
Figure 4:

E. MURRAINE.
HORSESHOE.

No. 183,195. Patented Oct. 10, 1876.

WITNESSES:
Wm Garner
F. M. Burnham

INVENTOR:
Ed. Murraine
per
F. A. Lehmann, Atty

JAMES R. OSGOOD & CO BOSTON

UNITED STATES PATENT OFFICE.

EDWARD MURRAINE, OF ROCHELLE, ILLINOIS.

IMPROVEMENT IN HORSESHOES.

Specification forming part of Letters Patent No. 183,195, dated October 10, 1876; application filed September 11, 1876.

*To all whom it may concern:*

Be it known that I, EDWARD MURRAINE, of Rochelle, in the county of Ogle and State of Illinois, have invented certain new and useful Improvements in Horseshoes; and I do hereby declare the following to be a full, clear, and exact description of the invention, such as will enable others skilled in the art to which it pertains to make and use it, reference being had to the accompanying drawings, which form part of this specification.

My invention relates to an improvement in horseshoes; and it consists in a shoe having a stud upon its top, a separate plate that has a notch to receive the stud, and that is adapted to be attached to the hoof without the use of nails, and a holding-band that passes up over the hoof, whereby the shoe can be attached to and removed from the foot without the use of a single nail, as will be more fully described hereinafter.

The accompanying drawings represent my invention.

$a$ represents an ordinary horseshoe of any desired construction, and to which the calk $c$ is riveted or otherwise attached. Through one side of the shoe is made a narrow slot, $d$, and on the opposite side is formed a flange, $e$, through which is made a bolt-hole, $g$. Passing up from this slot $d$ on one side, and the hole $g$ on the other, so as to encircle the front part of the hoof, is the holding-band $h$, which is made in two parts, and the upper ends made so that they may be loosened and adjusted at will, so as to fit the foot as loosely or as tightly as may be desired, or so as to fit feet of slightly different sizes. The lower end of that part of the band which passes through the slot has simply a stop formed on its end, while the other part has a screw-bolt, $i$, formed on it, which passes down through the hole $g$, and receives a nut, $o$, on its lower end. On the front of the shoe, near its inside top edge, is formed a stud, $n$, which projects a suitable distance above the top, and catches in a notch formed in the rear edge of the thin plate $l$ to prevent the shoe from slipping forward on the hoof.

This plate $l$ may be made of any desired length or thickness, and is secured to the hoof around the toe, so as to come between the hoof and shoe, and has a notch, $s$, cut in its rear edge for the stud $n$ to catch in. On the top of this plate $l$ are formed pins to enter the hoof and hold the plate in position.

This plate $l$ is made entirely separate from the shoe, and has no further connection with it than to prevent the shoe from moving forward upon the hoof.

Having thus described my invention, I claim—

The combination, with a horseshoe, having a stud, $n$, of the plate $l$, with the notch $s$, the plate being separately attached to the hoof, and entirely disconnected from the shoe, except by the stud and notch, and a holding-band, $h$, for attaching the shoe to the foot, substantially as and for the purposes specified.

In testimony that I claim the foregoing I have hereunto set my hand this 6th day of September, 1876.

EDWARD MURRAINE.

Witnesses:
WALLACE BROWN,
ALFRED S. HOADLEY.